(12) United States Patent
Jeong et al.

(10) Patent No.: US 8,847,882 B2
(45) Date of Patent: Sep. 30, 2014

(54) APPARATUS FOR RECOGNIZING THE POSITION OF AN INDICATING OBJECT

(75) Inventors: Seung-tae Jeong, Seongnamsi (KR); Bong-hwan Kim, Anyangsi (KR)

(73) Assignee: Smart Sense Technology Co., Ltd (KR)

( * ) Notice: Subject to any disclaimer, the term of this patent is extended or adjusted under 35 U.S.C. 154(b) by 235 days.

(21) Appl. No.: 13/508,174

(22) PCT Filed: Nov. 2, 2010

(86) PCT No.: PCT/KR2010/007642
§ 371 (c)(1),
(2), (4) Date: May 4, 2012

(87) PCT Pub. No.: WO2011/055952
PCT Pub. Date: May 12, 2011

(65) Prior Publication Data
US 2012/0218182 A1 Aug. 30, 2012

(30) Foreign Application Priority Data
Nov. 5, 2009 (KR) .................. 10-2009-0106469

(51) Int. Cl.
*G06F 3/01* (2006.01)
*G06F 3/042* (2006.01)

(52) U.S. Cl.
CPC .................... *G06F 3/0423* (2013.01)
USPC ........... 345/156; 345/175; 345/176; 345/177; 345/178; 178/18.09; 349/62; 349/65

(58) Field of Classification Search
CPC ... G06F 3/0421; G06F 3/0412; G06F 3/0436; G06F 3/0433; G06F 3/0418; G06F 3/0317; G06F 3/0386
USPC ................ 345/175–178; 178/18.09
See application file for complete search history.

(56) References Cited

U.S. PATENT DOCUMENTS

| 2001/0002694 A1* | 6/2001 | Nakazawa et al. ............ 250/221 |
| 2005/0248539 A1* | 11/2005 | Morrison et al. ............ 345/173 |
| 2009/0213093 A1* | 8/2009 | Bridger ........................ 345/175 |

FOREIGN PATENT DOCUMENTS

| JP | 2000-089903 | 3/2000 |
| JP | 2000-215001 | 8/2000 |

(Continued)

OTHER PUBLICATIONS

International Search Report—PCT/KR2010/007642 dated Aug. 1, 2011.

*Primary Examiner* — Alexander S Beck
*Assistant Examiner* — Amen Bogale
(74) *Attorney, Agent, or Firm* — Cantor Colburn LLP (57) ABSTRACT

The present invention relates to an apparatus for recognizing the position of an indicating object. An apparatus for recognizing the position of an indicating object of the present invention comprises: first reflecting means installed along the left, right, and bottom edges of a screen so as to reflect a laser beam emitted from object-detecting means back to the object-detecting means; said object-detecting means, formed as a pair, for analyzing a change in the amount of light in the reflected laser beam over time, and detecting position coordinates of the indicating object on the planar surface of the screen; and fixing means including a housing and a fixing member fixedly installed on an upper portion of the screen and coupled to the housing so as to fix the housing to the upper portion of the screen, the fixing means being intended for facilitating the installation of the object-detecting means on the upper portion of the screen. The apparatus of the present invention is an apparatus for recognizing the position of an indicating object that contacts a screen, wherein the apparatus is easy to transport and store, can protect the object-detecting means from dust and impurities, can easily be installed by a layperson having no expert knowledge, and can be installed without any restrictions in terms of screen size.

12 Claims, 10 Drawing Sheets

(56) References Cited

FOREIGN PATENT DOCUMENTS

| JP | 2000-322201 | 11/2000 |
| JP | 2002-268812 | 9/2002 |
| JP | 2005-228247 | 8/2005 |
| KR | 20-0207639 | 12/2000 |
| KR | 10-2004-0014763 | 2/2004 |
| KR | 10-2005-0005771 | 1/2005 |
| KR | 10-2008-0027321 | 3/2008 |

* cited by examiner

APPARATUS FOR RECOGNIZING THE POSITION OF AN INDICATING OBJECT

BACKGROUND OF THE INVENTION

1. Field of the Invention

The present invention relates to an apparatus for recognizing the position of an indicating object such as a finger or an indicating bar when a finger or an indicating bar is touched at a predetermined point on a screen (whiteboard, monitor) to which a video projector screen of a computer is projected.

2. Description of the Related Art

Recently, along with keyboards, essential input tools of persons using a PC in graphic user interface (GUI) times, such as PC Window or Macintosh, or the like, are an apparatus for recognizing the position of an indicating object (pointing apparatus).

When using the apparatus (pointing apparatus) for recognizing the position of an indicating object meaning an apparatus manufactured to operate a cursor (pointer) on a screen, the apparatus chooses a desired point while rapidly moving on the screen to perform necessary operations. In addition, a representative example of the apparatus (pointing apparatus) for recognizing the position of an indicating object is also a mouse.

A mouse first manufactured by Douglas C. Engelbart of Xerox in 1968 has been more widely used than any other apparatuses for recognizing the position of an indicating object (pointing apparatus) for more than 40 years since being born.

In addition to the mouse, an example of the apparatus for recognizing the position of an indicating object (pointing apparatus) may include a track ball and a pen-based tablet. However, the track ball and the pen-based tablet cannot match popularity of the mouse. The mouse has been continuously used in various forms while maintaining basic features of a mouse, such as a ball mouse, an optical mouse, a wireless mouse, or the like.

However, for moving a cursor (pointer), the mouse is basically operated only on a planar surface and therefore, cannot be operated in the air. Even though the touch screen is present, using only the touch screen causes inconvenience to users as long as various types of softwares (in particular, PC) operated only by the mouse are present. Therefore, in order to solve the problem, various researches have been conducted.

Korean Utility Model No. 20-0207639 discloses an apparatus for recognizing an X-Y position of an indicating object touched on a computer screen so as to transfer positional information about an indicating object displayed on a computer screen to a computer, wherein the apparatus recognizes a position of an indicating object on a horizontal surface by using an optical image sensor (linear CCD) attached to both corners of an upper end of a planar plate for recognizing an indicated position by using a finger to be used as an indicating object designating a position of a computer position on a transparent planar plate attached to a front surface of a computer monitor or a dedicated indicating pen for more precisely indicating a position and performs triangulation calculation on a position value of an object indicated, fixed, and recognized on the planar plane by using a microprocessor (CPU) and converts a value of an X-Y position of the indicating object into the same value as resolution of a monitor used for the computer and continuously transfers the converted value to the computer so as to directly select images on the computer screen and directly input letters and images on the screen.

Korean Patent Laid-Open No. 10-2008-0027321 discloses a remote wireless pointing apparatus using a cross-shape laser beam and a light receiving element, which includes a transmitter to which a laser module light-emitted in a cross shape (+) and a receiver in which a plurality of light receiving elements are aligned in a line vertically and horizontally arranged on the surface of the monitor so as to sense the laser beam and a control means calculating pointing positions on the monitor when the cross-shaped central portion of the laser indicates the monitor.

However, according to the related arts as described above, the apparatus for recognizing the position can have a complicated structure due to the cameras installed on the upper left and upper right of the screen or can be installed only by experts having expert knowledge due to light emitting devices and light receiving devices densely installed around the screen, restrict the screen size, cannot be easily transported and stored, and can degrade in light efficiency due the surrounding spill light.

SUMMARY OF THE INVENTION

In order to solve the problem, it is an object of the present invention to provide an object sensing means formed as two pairs that is generally installed so as to separate from each other but may be integrally installed at both ends in the housing having a hollow bar shape, such that they can be easily transported and stored, protect the object sensing means from dust and impurities introduced from the outside, be easily installed by the public having no expert knowledge, and be touched to the screen without any restrictions in terms of the screen size.

In order to achieve the object of the present invention, an apparatus for recognizing the position of an indicating object includes: a first reflecting means that is installed along left, right, and bottom edges of a screen to again retro-reflect a laser beam irradiated from an object-sensing means to the object sensing means; an object sensing means formed as two pairs that is disposed on the upper left and right of the screen at a predetermined distance to irradiate a laser beam to the first reflecting means, receive the laser beam retro-reflected from the first reflecting means, and analyze a change in light amount of the reflected laser beam over time so as to sense position coordinates of an indicating object on a planar surface of the screen; and a fixing means including a housing having a hollow bar shape to accommodate the object sensing means therein and a fixing member fixing the housing to the upper portion of the screen by fixedly being installed to the upper portion of the screen so as to be combined with the housing, such that the object sensing means is be easily installed on the upper portion of the screen.

The first reflecting means may include a rectangular bar-shaped sponge that is installed at an edge of the screen and is cut to match a size of the screen, retro-reflective films that are formed on an upper surface of the sponge and again retro-reflects the laser beam input from the object sensing means to the object sensing means, and a protective film that is installed on a surface crossing with a surface on which the retro-reflective films are formed at a higher position than the retro-reflective films, prevents light introduced from the outside from entering the retro-reflective films, and prevents scattered light of the laser beam from being incident to a human eye from a front.

The retro-reflective film may include a saw type base film layer, a reflective layer formed over the base film layer, and a protective layer formed over the reflective layer.

The retro-reflective film may include a base film layer, a reflective layer formed over the base film layer, and a high refractive glass layer formed over the reflective layer.

The object sensing means may include: a laser beam irradiating means installed so as to face the screen surface to irradiate the laser beam to the screen; a scan means including a 45° squared prism shaped mirror that is installed in an optical axis direction of the laser beam irradiating means to receive the laser beam irradiated from the laser beam irradiating means and make the propagation direction of the laser beam parallel with the screen and a synchronization signal detector. that is disposed on the upper portion of the 45° squared prism shaped mirror in the optical axis direction to receive the laser beam when the laser beam is irradiated to the upper portion of the screen by rotating the 45° squared prism shaped mirror, thereby scanning a position angle of the indicating object; a refracting means installed between the laser beam irradiating means and the scan means to transmit the laser beam irradiated from the laser beam irradiating means, irradiate the transmitted laser beam to the scan means, and refract the laser beam returned to the scan means via the first reflecting means from the scan means at an angel of 90°; and a detecting means installed on a side of the refracting means 1 to condense the laser beam returned by sequentially transmitting the scan means and the refracting means 1 via the first reflecting means, thereby detecting whether the indicating object is touched to the screen.

The fixing member may include a ㄴ-letter fixing bracket, a fixing bolt, and a spring that move in front, back, left and right directions against the screen.

The laser beam irradiating means may include a semiconductor laser to irradiate the laser beam and a condensing lens that is formed on a front of the semiconductor layer to make a laser beam irradiated from the semiconductor laser into parallel light.

The scan means may be provided with a regular polygon mirror a.

The 45° squared prism shaped mirror of the scan means may be installed with a motor so as to rotate 360°.

The refracting means may include any one selected from a half mirror, a polarizing beam splitter, and a full reflective mirror.

When the refracting means is the polarizing beam splitter or the full reflective mirror, a narrow band filter may be further installed.

When the refracting means is the polarizing beam splitter, a quarter wavelength plate a may be further installed.

The detecting means may include a light receiving lens that receives a laser beam, a photo detector that is installed on the side of the light receiving lens to condense the laser beam through the light receiving lens and convert strength of the laser beam into an electrical signal, and a microcomputer that analyzes the electrical signal of the laser beam received from the photo detector.

In order to achieve the object of the present invention, an apparatus for recognizing the position of an indicating object includes: a second reflecting means that again retro-reflects a laser beam irradiated from an object sensing means to the object sensing means; an object sensing means formed as two pairs that is disposed on the upper left and right of a screen at a predetermined distance to irradiate the laser beam toward the second reflecting means, receive the laser beam retro-reflected from the second reflecting means, and analyze the change in light amount of the reflected laser beam over time to sense the position coordinates of the indicating object on the planar surface of the screen; and a fixing means including a housing having a hollow bar shape to accommodate the object sensing means therein and a fixing member fixing the housing to the upper portion of the screen by being fixedly installed on the upper portion of the screen to be combined with the housing, thereby easily installing the object sensing means on the upper portion of the screen.

The second reflecting means may be installed so as to surround retro-reflective films at an end of the indicating objects 360°.

DETAILED DESCRIPTION OF THE PREFERRED EMBODIMENT

Exemplary embodiments of the present invention will be described below in detail with reference to the drawings.

Figure 1:
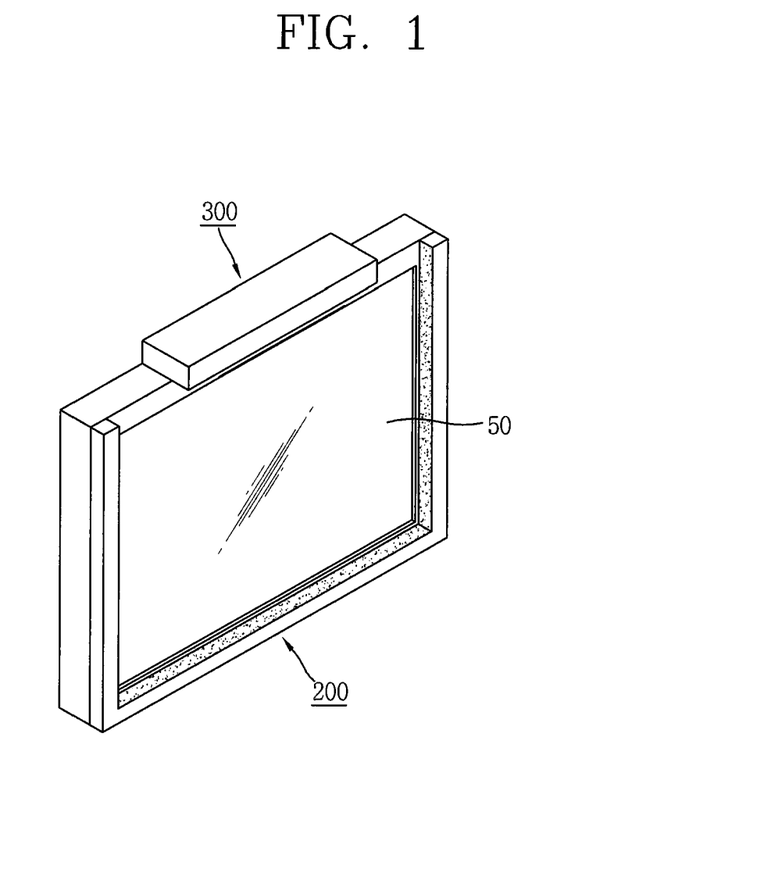
FIG. 1 is a perspective view of a device for recognizing the position of an indicating object according to a first embodiment of the present invention.
Figure 2:
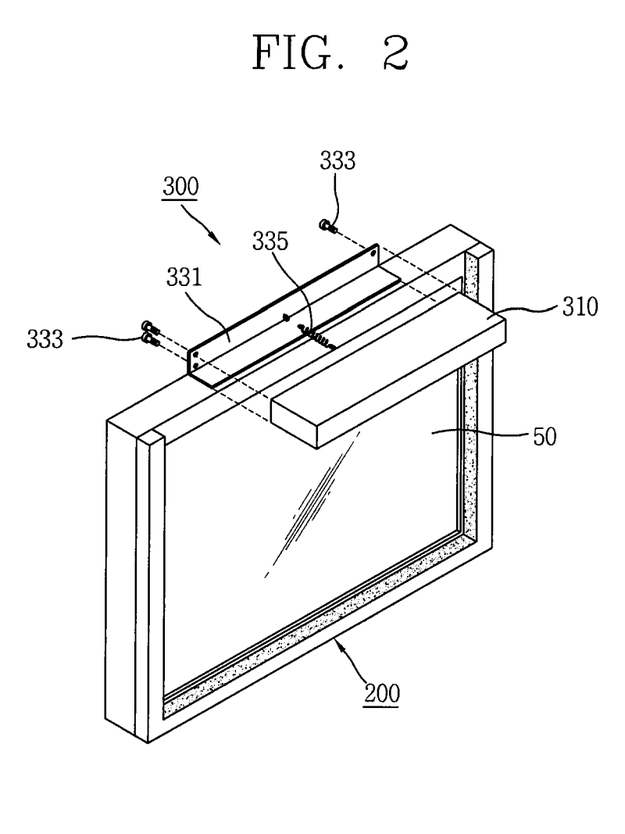
FIG. 2 is an exploded view of perspective view of the apparatus for recognizing the position of an indicating object according to the first embodiment of the present invention.
Figure 3:
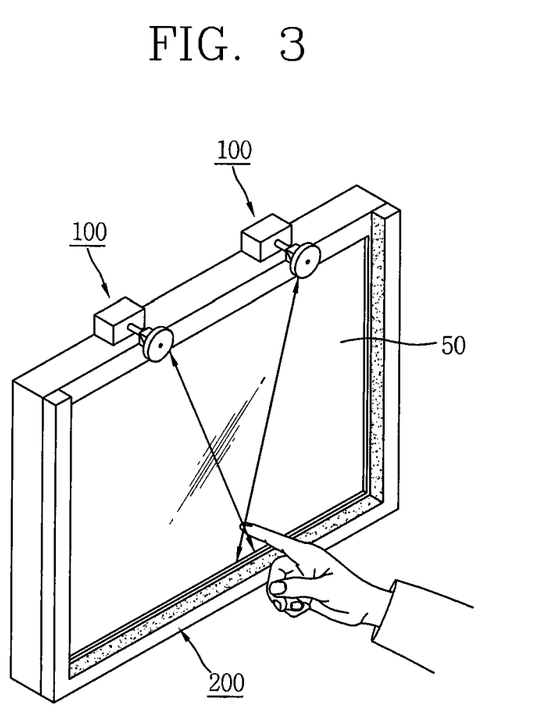
FIGS. 3 and 4 are a detailed view of the apparatus for recognizing the position of an indicating object according to the first embodiment of the present invention.
Figure 4:
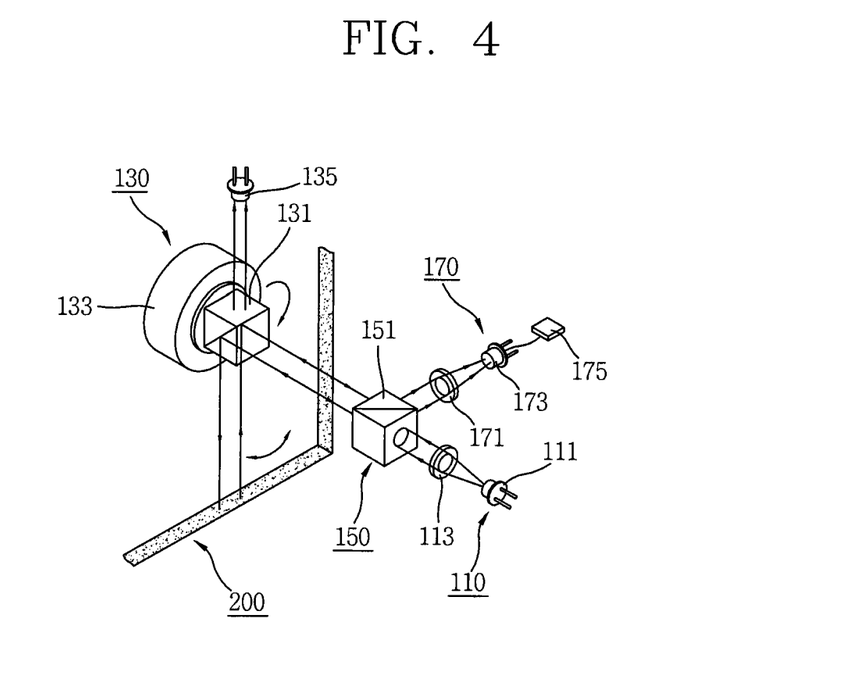
Figure 5:
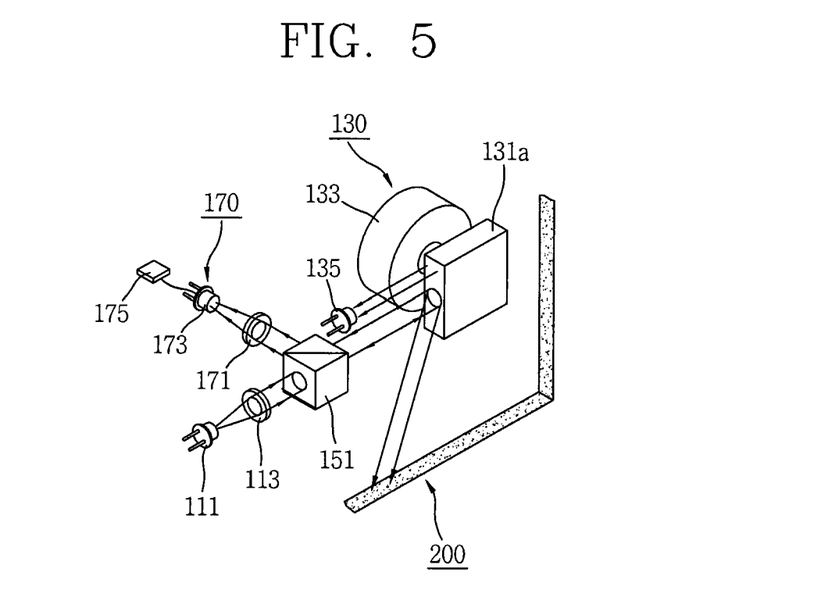
FIG. 5 is a view showing another example of a scan means of the apparatus for recognizing the position of an indicating object according to the first embodiment of the present invention.
Figure 6:
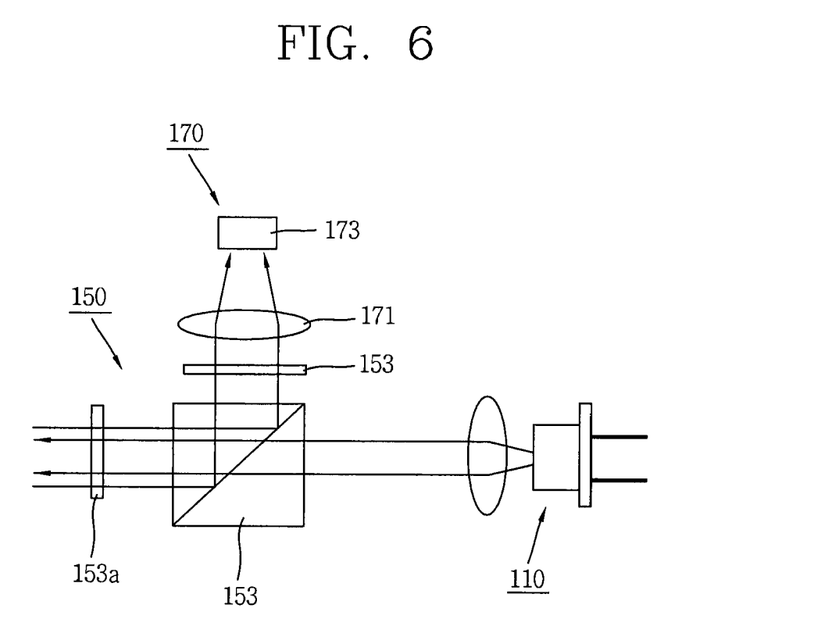
FIG. 6 is a detailed view of a refracting means (polarizing beam splitter) of the apparatus for recognizing the position of an indicating object according to the first embodiment of the present invention.
Figure 7:
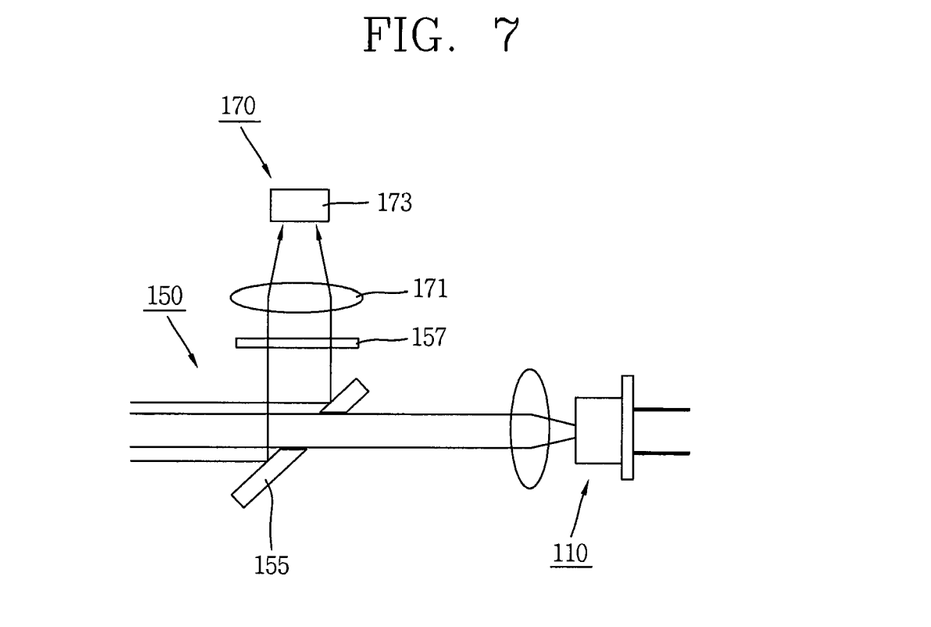
FIG. 7 is a detailed view of a refracting means (full reflection mirror) of the apparatus for recognizing the position of an indicating object according to the first embodiment of the present invention.
Figure 8:
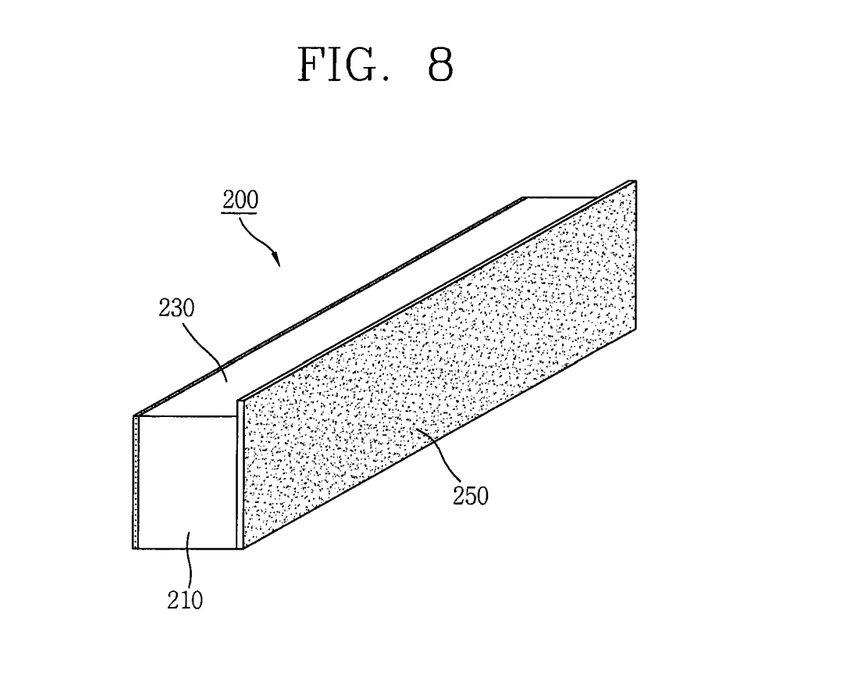
FIG. 8 is a detailed view of a reflecting means of the apparatus for recognizing the position of an indicating object according to the first embodiment of the present invention.
Figure 9:
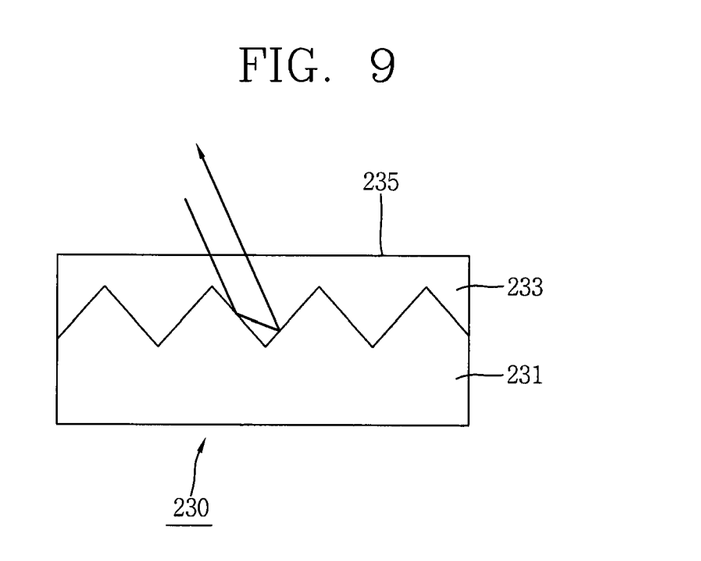
FIG. 9 is a detailed view of a retro-reflective film of the apparatus for recognizing the position of an indicating object according to the first embodiment of the present invention.
Figure 10:
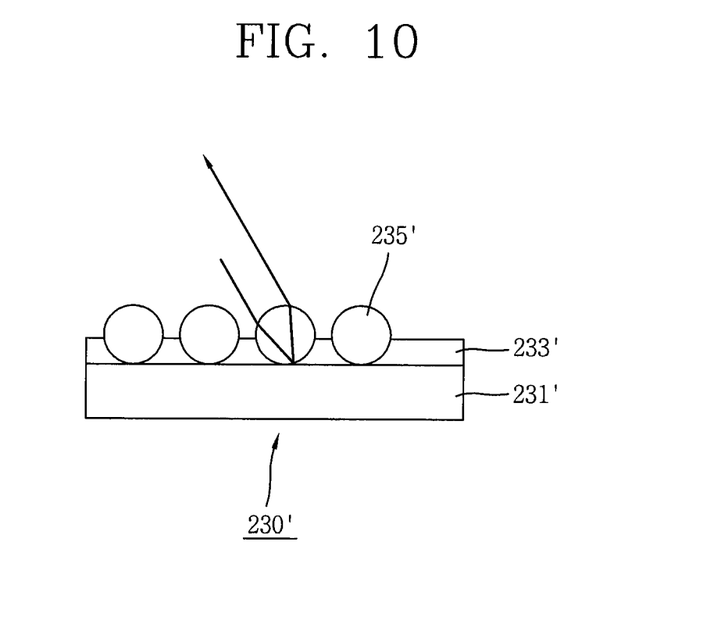
FIG. 10 is a detailed view of a retro-reflective film of another example of an apparatus for recognizing the position of an indicating object according to the first embodiment of the present invention.
Figure 11:
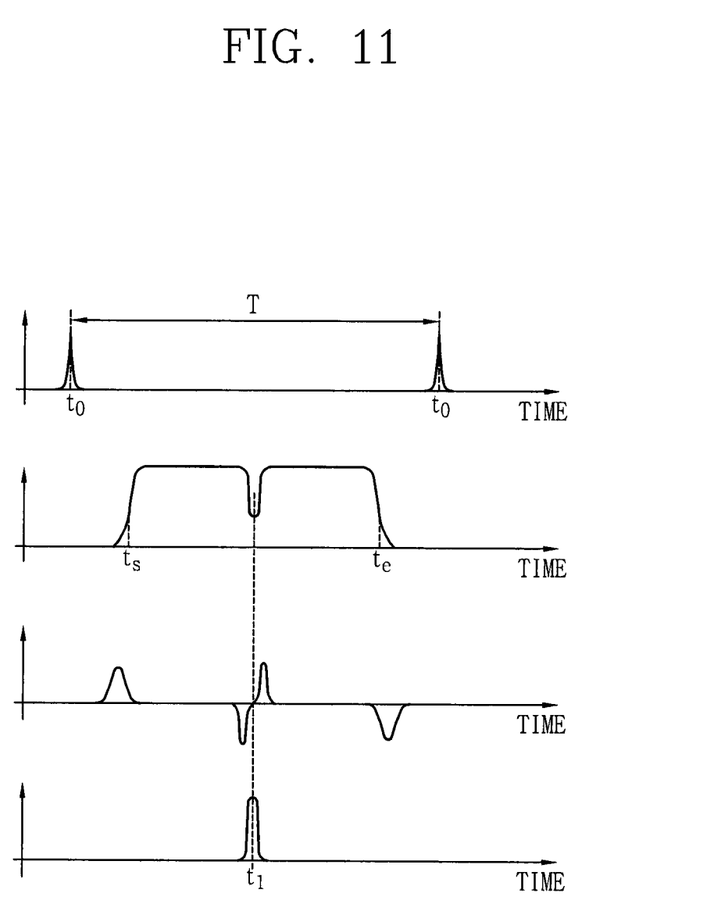
FIG. 11 is a diagram showing an example of signal detection of the apparatus for recognizing the position of an indicating object according to the first embodiment of the present invention.
Figure 12:
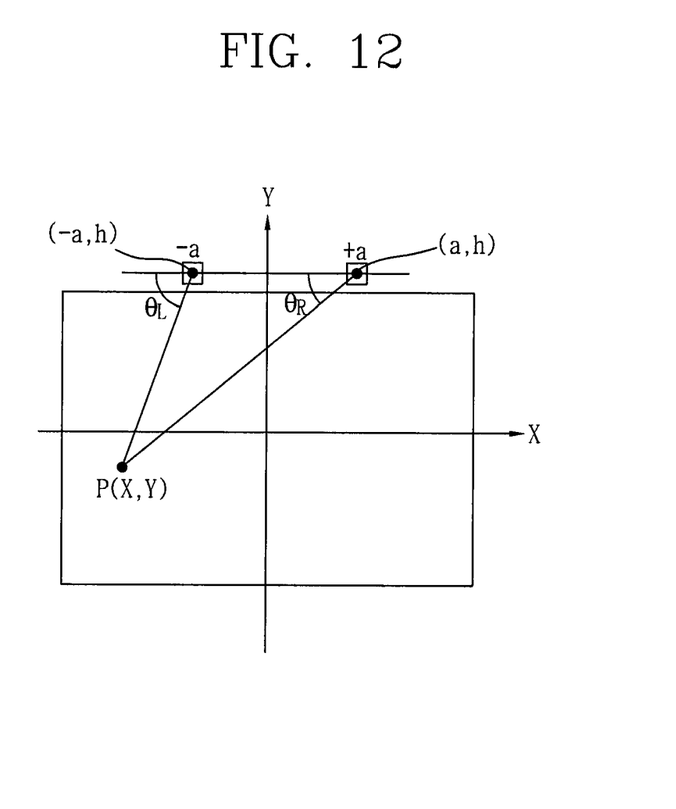
FIG. 12 is a diagram showing an example of position coordinates of the apparatus for recognizing the position of an indicating object according to the first embodiment of the present invention.
Figure 13:
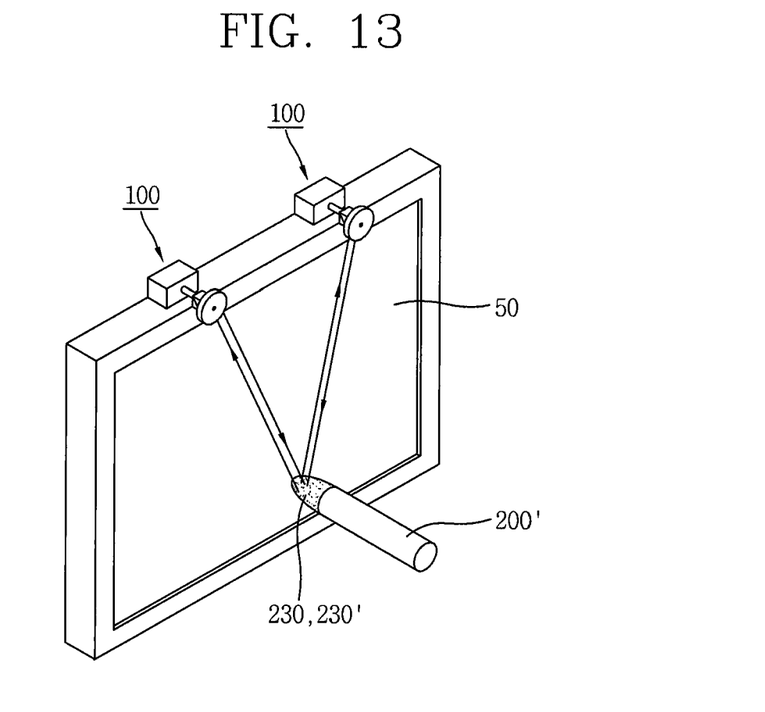
FIG. 13 is a perspective view of an apparatus for recognizing the position of an indicating object according to a second embodiment of the present invention.
Figure 14:
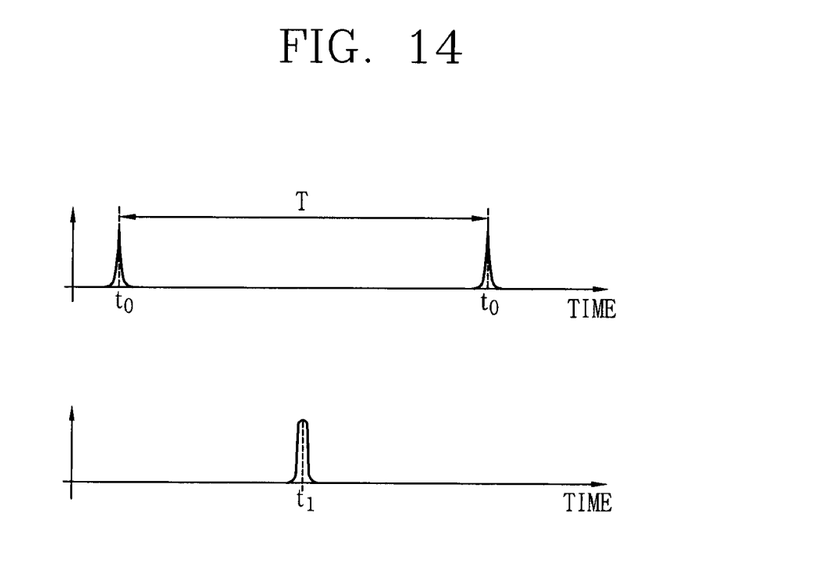
FIG. 14 is a diagram showing an example of signal detection of the apparatus for recognizing the position of an indicating object according to the second embodiment of the present invention.

FIG. 1 is a perspective view of an apparatus for recognizing the position of an indicating object according to a first embodiment of the present invention, FIG. 2 is an exploded view of perspective view of the apparatus for recognizing the position of an indicating object according to the first embodiment of the present invention, FIGS. 3 and 4 are a detailed view of the apparatus for recognizing the position of an indicating object according to the first embodiment of the present invention, FIG. 5 is a view showing another example of a scan means of the apparatus for recognizing the position of an indicating object according to the first embodiment of the present invention, FIG. 6 is a detailed view of a refracting means (polarizing beam splitter) of the apparatus for recognizing the position of an indicating object according to the first embodiment of the present invention, FIG. 7 is a detailed view of a refracting means (full reflection mirror) of the apparatus for recognizing the position of an indicating object according to the first embodiment of the present invention, FIG. 8 is a detailed view of a reflecting means of the apparatus for recognizing the position of an indicating object according to the first embodiment of the present invention, FIG. 9 is a detailed view of a retro-reflective film of the apparatus for recognizing the position of an indicating object according to the first embodiment of the present invention, FIG. 10 is a detailed view of a retro-reflective film of another example of an apparatus for recognizing the position of an indicating object according to the first embodiment of the present invention, FIG. 11 is a diagram showing an example of signal detection of the apparatus for recognizing the position of an indicating object according to the first embodiment of the present invention, FIG. 12 is a diagram showing an example of position coordinates of the apparatus for recognizing the position of an indicating object according to the first embodiment of the present invention, FIG. 13 is a perspective view of an apparatus for recognizing the position of an indicating object according to a second embodiment of the present invention, and FIG. 14 is a diagram showing an example of signal detection of the apparatus for recognizing the position of an indicating object according to the second embodiment of the present invention.

As shown in the drawings, the apparatus for recognizing the position of an indicating object according to the embodiment of the present invention can recognize a position when a finger, an indicating bar, or the like, is touched at a predetermined point on a screen (whiteboard, monitor) 50 to which a video projector screen of a computer is projected.

The apparatus for recognizing the position of an indicating object according to the embodiment of the present invention is configured to include a first reflecting means 200, object sensing means 100, and a fixing means 300.

Further, the apparatus for recognizing the position of an indicating object is connected to a computer to move a pointing cursor or perform a click function of a mouse.

The first reflecting means 200 is installed along left, right, and lower edges of the screen 50 and is formed to again retro-reflect a laser beam irradiated from the object sensing means 100 to the object sensing means 100.

As described above, the first reflecting means 200 includes a rectangular bar-shaped sponge 210 attached with a double sided tape that may be installed at an edge of the screen 50 and be cut to match a size of the screen 50, retro-reflective films 230 and 230' that are formed on an upper surface of the sponge 210 and again retro-reflects the laser beam input from the object sensing means 100 to the object sensing means 100, and a protective film 250 that is installed on a surface crossing with a surface on which the retro-reflective films 230 and 230' are formed at a higher position than the retro-reflective films 230 and 230', prevents light introduced from the outside from entering the retro-reflective films 230 and 230', and prevents scattered light of the laser beam from being incident to a human eye from the front.

In this case, the retro-reflective film 230 includes a saw type base film layer 231, a reflective layer 233 formed over the base film layer 231, and a protective layer 235 formed over the reflective layer 233.

Further, the retro-reflective film 230' may be configured to include a base film layer 231', a reflective layer 233' formed over the base film layer 231, and a high refractive glass layer 235' formed over the reflective layer 233'.

That is, the first reflecting means 200 may be cut to match the size of the screen 50 and therefore, may be easily installed for various screens (whiteboard, monitor).

The object sensing means 100 formed as two pairs is disposed on the upper left and right of the screen 50 at a predetermined distance to irradiate a laser beam to the first reflecting means 200, receive the laser beam retro-reflected from the first reflecting means 200, and analyze a change in light amount of the reflected laser beam over time to sense position coordinates of an indicating object on a planar surface of the screen 50.

As such, the object sensing means 100 is configured to include a laser beam irradiating means 110, a scan means 130, a refracting means 150, and a detecting means 170.

The laser beam irradiating means 110 installed so as to face the screen 50 surface to irradiate the laser beam to the screen 50 and a condensing lens 113 that is formed on a front of the semiconductor laser 111 to make a laser beam irradiated from the semiconductor laser 111 into parallel light.

The scan means 130 is configured to include a 45° squared prism shaped mirror 131 that is installed in an optical axis direction of the laser beam irradiating means 110 to receive the laser beam irradiated from the laser beam irradiating means 110 and make the propagation direction of the laser beam parallel with the screen 50 and a synchronization signal detector 135 that is disposed on the upper portion of the 45° squared prism shaped mirror 131 in the optical axis direction to receive the laser beam when the laser beam is irradiated to the upper portion of the screen 50 by rotating the 45° squared prism shaped mirror 131, thereby scanning a position angle of the indicating object.

In this case, the scan means 131 may be provided with a regular polygon mirror 131a instead of the 45° squared prism shaped mirror 131.

At the time of installing the regular polygon mirror 131a, the laser beam irradiated from the laser beam irradiating means 110 needs to be installed to be propagated in parallel with the surface of the screen.

As such, the regular polygon mirror 131a may reduce a protruded height of the installed products by installing a motor 133 at the back of the screen 50.

Further, the 45° squared prism shaped mirror 131 of the scan means 130 is installed with a motor 133 so as to rotate 360°.

That is, the laser beam incident to the scan means 130 is propagated in parallel with the planar surface of the screen 50 through the 45° squared prism shaped mirror 131 and the motor 133 installed on the 45° squared prism shaped mirror 131 rotates 360° to irradiate the overall screen 50.

In this case, when the laser beam is irradiated to the upper portion of the screen 50 having no the first reflective means 200 by irradiating the laser beam to the overall screen 50 by the rotating scan means 130, the laser beam is irradiated to the synchronization signal detector 135 to scan the electrical signal of the position angle and when the laser beam is irradiated to the range in which the first reflecting means is formed, the laser beam is again retro-reflected to the scan mead 130 via the first reflecting means 200 and the propagation direction of the laser beam is refracted by the 45° squared prism shaped mirror 131 of the scan means 130 and propagated to the refracting means 150.

The refracting means 150 is installed between the laser beam irradiating means 110 and the scan means 130 to transmit the laser beam irradiated from the laser beam irradiating means 110, irradiate the transmitted laser beam to the scan means 130, and refract the laser beam returned to the scan means 130 via the first reflecting means 200 from the scan means 130 at an angel of 90° and is configured to include any one selected from a half mirror 151, a polarizing beam splitter 153, and a full reflective mirror 155.

In addition, when the refracting means 150 is the polarizing beam splitter 153 or the full reflective mirror 155, a narrow band filter 157 is further installed.

The narrow band filter 157, which is a filter transmitting only the laser beam, prevents external light from being incident to a detecting means 170, thereby preventing noise from occurring from an electrical signal.

In this case, when the refracting means 150 is the polarizing beam splitter 153, a quarter wavelength plate 153a needs to be further installed along with the polarizing beam splitter 153 so as to refract the propagation direction of the laser beam at an angle of 90°.

The detecting means 170 is installed on a side of the refracting means 150 to condense the laser beam returned by sequentially transmitting the scan means 130 and the refracting means 150 via the first reflecting means 200, thereby detecting whether the indicating object is touched to the screen 50.

As such, the detecting means 170 is configured to include a light receiving lens 171 that receives a laser beam, a photo detector 173 that is installed on the side of the light receiving lens 171 to condense the laser beam through the light receiving lens 171 and convert strength of the laser beam into an electrical signal, and a microcomputer 175 that analyzes the electrical signal of the laser beam received from the photo detector 173.

As shown in FIG. 11, an example of the signal detection of the apparatus for recognizing the position of an indicating object will be described below.

When the laser beam irradiated from the laser beam irradiating means 110 is irradiated to the scan means 130 via the refracting means 150, the scan means 130 irradiates the upper portion of the screen on which the first reflecting means 200 is not installed during a process of scanning the screen 50 at an angle of 360° to arrive at a synchronization signal detector 135 that is installed on the upper portion of the scan means 135, thereby generating a synchronization signal t0.

Thereafter, the scan means 130 continuously rotates to arrive at the first reflecting means 200, such that the laser beam is retro-reflected and to effectively arrive at the detecting means 170 by sequentially transmitting the scan means 130 and the refracting means 150 again, such that the electrical signal increase ts starts.

Next, when an indicating object P is touched to the screen 50, the laser beam is scattered by the indicating object P to excessively reduce a ratio of the laser beam returned to the detecting means 170, thereby generating a reverse direction electrical signal t1.

Next, the scan means 130 continuously rotates the screen 50 and thus, starts to deviate from a range in which the first reflecting means 200 is installed, such that electrical signal decrease ts is continued and disappears.

Next, when the scan means 130 continuously rotates, the laser beam again arrives at the synchronization signal detector 135 and therefore, a process of generating the synchronization signal is repeated.

In this case, a position angle can be appreciated from a time interval between the synchronization signals, that is, a rotation period T of the scan means.

As such, the apparatus for recognizing the position of an indicating object according to the embodiment of the present invention can recognize position coordinates of the indicating object P by using a signal generation time of the indication object P.

For example, as shown in FIG. 12, the position coordinates of the indicating object P is calculated as follows.

$$\theta_L + 90° = 360° \times (t-t0)/T$$

That is, $\theta_L = 360° \times (t-t0)/T - 90°$

Therefrom, the angle can be appreciated from the above Equation. Meanwhile, $\theta_R$ can be appreciated similar thereto. The position coordinates of the indicating object can be obtained using the obtained angle by the following Equation.

$$\tan\theta_L \equiv t_L$$
$$\tan\theta_R \equiv t_R$$
$$Y = t_L x + (h + t_L a)$$
$$Y = t_R x + (h - t_R a)$$
$$\therefore$$
$$X = \frac{t_L + t_R}{t_R - t_L} a,$$
$$Y = 2\frac{t_L t_R}{t_R - t_R} a + h$$

The fixing means 300 includes a housing 310 having a hollow bar shape to accommodate the object sensing means 100 therein and a fixing member 330 fixing the housing 310 to the upper portion of the screen 50 by fixedly being installed to the upper portion of the screen 50 so as to be combined with the housing 310, such that the object sensing means 100 may be easily installed on the upper portion of the screen.

In this case, the fixing member 330 is configured to include a ⌐-letter fixing bracket 331, a fixing bolt 333, and a spring 335 that can move in front, back, left and right directions against the screen 50.

That is, the housing accommodating the object sensing means 100 on the upper portion of the screen 50 to be installed is seated in the fixing bracket 331, having the spring installed therebetween and is fixed by controlling a distance from the planar surface of the screen 50 by the fixing bolt 333 that can move in front, back, left and right directions.

According to the embodiment of the present invention, two pairs of the object sensing means may be generally installed so as to separate from each other, but may be integrally installed at both ends in the housing having a hollow bar shape, such that they can be easily transported and stored, protect the object sensing means from dust and impurities introduced from the outside, be easily installed by the public having no expert knowledge, and be installed by cutting the first reflecting means according to the size of the screen without any restrictions in terms of the screen size.

As shown in FIG. 13, an apparatus for recognizing the position of an indicating object according to a second embodiment of the present invention is configured to include a second reflecting means 200' that again retro-reflects the laser beam irradiated from the object sensing means 100 to the object sensing means 100, the object sensing means 100 formed as two pairs that is disposed on the upper left and right of the screen 50 at a predetermined distance to irradiate the laser beam toward the second reflecting means 200', receive the laser beam retro-reflected from the second reflecting means 200', and analyze the change in light amount of the reflected laser beam over time to sense the position coordinates of the indicating object on the planar surface of the screen 50; the fixing means 300 including the housing 310 having a hollow bar shape to accommodate the object sensing means therein and the fixing member 330 fixing the housing 310 to the upper portion of the screen 50 by being fixedly installed on the upper portion of the screen 50 to be combined with the housing 310, thereby easily installing the object sensing means 100 on the upper portion of the screen 50.

Further, the second reflecting means 200' is installed so as to surround retro-reflective films 230 and 230' at an end of the indicating objects 360°.

That is, the second reflecting means 200' is installed so as to surround the retro-reflective films 230 and 230' at an end of a pencil-shaped indicating object 360° such that the first reflecting means 200 is not installed at an edge of the screen 50. As a result, all the objects having a general bar shape cannot be used as the indicating object, but there is no need to install the first reflecting means 200 at the edge of the screen 50.

As such, the signal detection of the apparatus for recognizing the position of an indicating object according to the second embodiment of the present invention generates the electrical signal when the laser beam reaches the second reflecting means, as shown in FIG. 14.

The following signal processing may be similarly performed to the signal detection of the apparatus for recognizing the position of an indicating object according to the first embodiment of the present invention.

According to the embodiment of the present invention, two pairs of the object sensing means may be generally installed so as to separate from each other, but may be integrally installed at both ends in the housing having a hollow bar shape, such that they can be easily transported and stored, protect the object sensing means from dust and impurities introduced from the outside, be easily installed by the public having no expert knowledge, and be installed by cutting the first reflecting means according to the size of the screen without any restrictions in terms of the screen size.

In addition, the embodiment of the present invention blocks the unnecessary surrounding spill light to maximize the efficiency of the laser beam.

Although an embodiment of the present invention was described in detail above, it should be understood that the present invention may be implemented in various ways by those skilled in the art without departing from the spirit and basic features of the present invention.

What is claimed is:

1. An apparatus for recognizing the position of an indicating object, comprising:
a first reflecting means (200) that is installed along left, right, and bottom edges of a screen (50) to again retro-reflect a laser beam irradiated from an object-sensing means (100) to the object sensing means (100);
an object sensing means (100) formed as two pairs that is disposed on the upper left and right of the screen (50) at a predetermined distance to irradiate a laser beam to the first reflecting means (200), receive the laser beam retro-reflected from the first reflecting means (200), and analyze a change in light amount of the reflected laser beam over time so as to sense position coordinates of an indicating object on a planar surface of the screen (50); and
a fixing means (300) including a housing (310) having a hollow bar shape to accommodate the object sensing means (100) therein and a fixing member (330) fixing the housing (310) to the upper portion of the screen (50) by fixedly being installed to the upper portion of the screen (50) so as to be combined with the housing (310), such that the object sensing means (100) is be easily installed on the upper portion of the screen,
wherein the object sensing means (110) includes:
a laser beam irradiating means (110) installed so as to face the screen (50) surface to irradiate the laser beam to the screen (50);
a scan means (130) including a 45° squared prism shaped mirror (131) that is installed in an optical axis direction of the laser beam irradiating means (110) to receive the laser beam irradiated from the laser beam irradiating means (110) and make the propagation direction of the laser beam parallel with the screen (50) and a synchronization signal detector (135) that is disposed on the upper portion of the 45° squared prism shaped mirror (131) in the optical axis direction to receive the laser beam when the laser beam is irradiated to the upper portion of the screen (50) by rotating the 45° squared prism shaped mirror (131), thereby scanning a position angle of the indicating object;
a refracting means (150) installed between the laser beam irradiating means (110) and the scan means (130) to transmit the laser beam irradiated from the laser beam means (110), irradiated the transmitted laser beam to the scan means (130), and refract the laser beam returned to the scan means (130) via the first reflecting means (200) from the scan means(130) at an angel of 90° ;and
a detecting means (170) installed on a side of the refracting means (150) to condense the laser beam returned by sequentially transmitting the scan means (130) and the refracting means (150) via the first reflecting means (200), thereby detecting whether the indicating object is touched to the screen (50).

2. The apparatus of claim 1, wherein the first reflecting means (200) includes a rectangular bar-shaped sponge (210) that is installed at an edge of the screen (50) and is cut to match a size of the screen (50), retro-reflective films (230) and (230') that are formed on an upper surface of the sponge (210) and again retro-reflects the laser beam input from the object sensing means (100) to the object sensing means (100), and a protective film (250) that is installed on a surface crossing with a surface on which the retro-reflective films (230) and (230') are formed at a higher position than the retro-reflective films (230) and (230'), prevents light introduced from the outside from entering the retro-reflective films (230) and (230'), and prevents scattered light of the laser beam from being incident to a human eye from a front.

3. The apparatus of claim 2, wherein the retro-reflective film (230) includes a saw type base film layer (231), a reflective layer (233) formed over the base film layer (231), and a protective layer (235) formed over the reflective layer (233).

4. The apparatus of claim 2, wherein the retro-reflective film (230') includes a base film layer (231'), a reflective layer (233') formed over the base film layer (231'), and a high refractive glass layer (235') formed over the reflective layer (233').

5. The apparatus of claim 1, wherein the fixing member (330) includes a L-letter fixing bracket (331), a fixing bolt (333), and a spring (335) that can move in front, back, left and right directions against the screen (50).

6. The apparatus of claim 1, wherein the laser beam irradiating means (110) includes a semiconductor laser (111) to irradiate the laser beam and a condensing lens (113) that is formed on a front of the semiconductor laser (111) to make a laser beam irradiated from the semiconductor laser (111) into parallel light.

7. The apparatus of claim 1, wherein the scan means (130) is provided with a regular polygon mirror (131*a*).

8. The apparatus of claim 1, wherein the 45° squared prism shaped mirror (131) of the scan means (130) is installed with a motor (133) so as to rotate 360°.

9. The apparatus of claim 1, wherein the refracting means (150) includes any one selected from a half mirror (151), a polarizing beam splitter(153), and a full reflective mirror (155).

10. The apparatus of claim 9, wherein when the refracting means (150) is the polarizing beam splitter (153) or the full reflective mirror (155), a narrow band filter (157) is further installed.

11. The apparatus of claim 10, wherein when the refracting means (150) is the polarizing beam splitter, a quarter wavelength plate (153*a*) is further installed.

12. The apparatus of claim 1, wherein the detecting means (170) includes a light receiving lens (171) that receives a laser beam, a photo detector (173) that is installed on the side of the light receiving lens (171) to condense the laser beam through the light receiving lens (171) and convert strength of the laser beam into an electrical signal, and a microcomputer (175) that analyzes the electrical signal of the laser beam received from the photo detector (173).

* * * * *